June 3, 1941.  F. H. WATSON  2,243,930
VALVE STEM AND CHECK VALVE THEREFOR
Original Filed Aug. 15, 1932
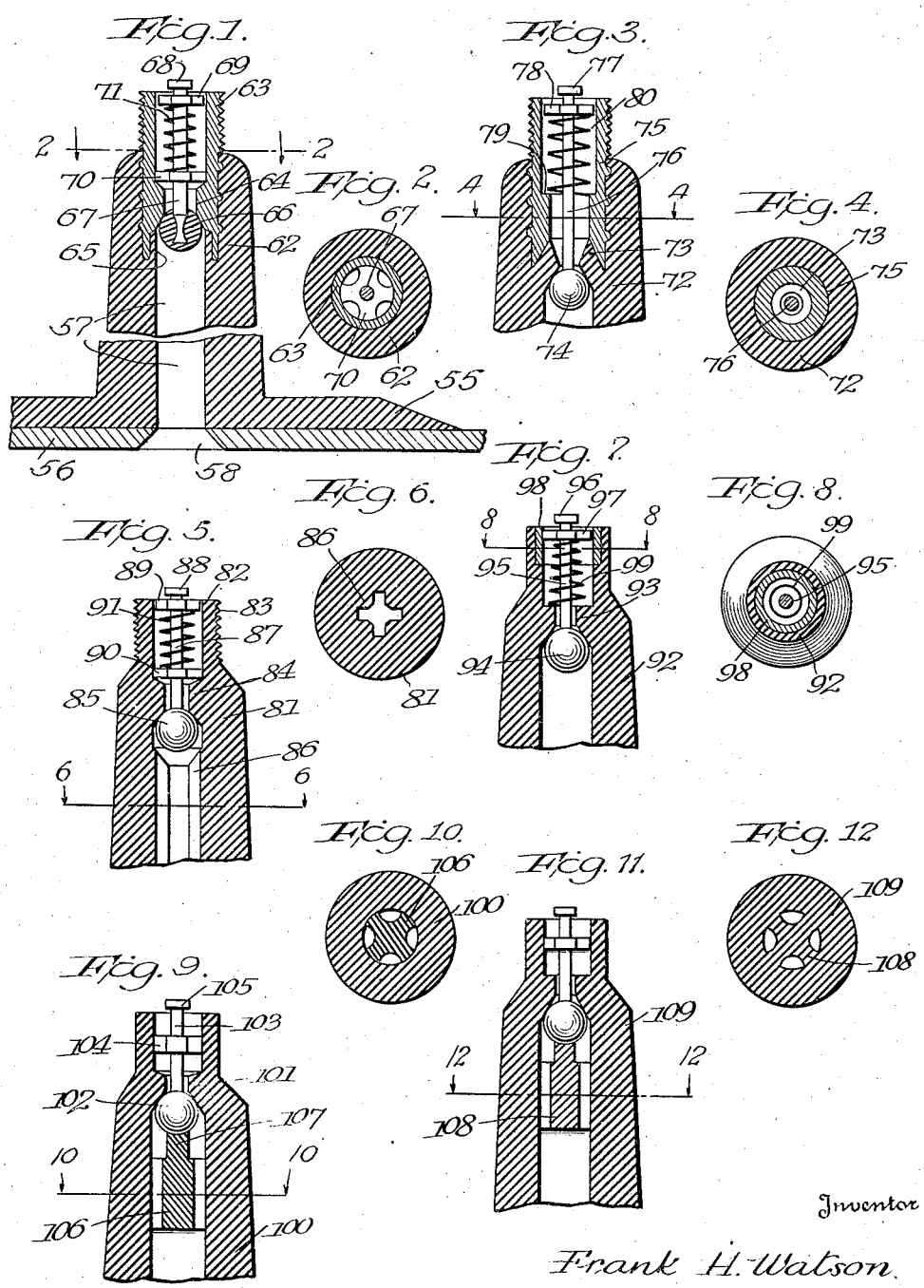

Patented June 3, 1941

2,243,930

UNITED STATES PATENT OFFICE 2,243,930

VALVE STEM AND CHECK VALVE THEREFOR

Frank H. Watson, Jonesboro, Ark., assignor to Jenkins Bros., Bridgeport, Conn., a corporation of New Jersey Original application August 15, 1932, Serial No. 628,953, now Patent No. 2,106,671, dated January 25, 1938. Divided and this application May 5, 1937, Serial No. 140,927

4 Claims. (Cl. 251—137)

This application is a division of my application Serial No. 628,953 filed August 15, 1932, now Patent No. 2,106,671, granted January 25, 1938.

The present invention relates to valve stems and check valves therefor and has as its object a simplified combination of parts wherein elements heretofore essential are eliminated without loss of effectiveness and at a considerable saving in manufacturing costs. While the invention in some of its broader aspects relates to combinations including valve stems generally, the use of valve stems of yieldable material such as rubber or rubber composition is preferable and in some instances essential. That is to say, more specifically, the invention relates to valve stems of the type disclosed in Reissue Patent No. 18,513, issued to me on July 5, 1932, and I have chosen to illustrate the invention as applied to valve stems of this type.

According to one form which the invention may take, a valve stem of rubber composition is provided with a through passage presenting a downwardly faced shoulder directly against which is adapted to seat a check valve which latter is subject to variation in design as regards its form and appurtenant elements. According to another form which the invention may take, a tubular liner or nipple of relatively rigid material, such as metal, is secured in the upper end of the valve stem passage and provides a seat with which the check valve directly cooperates. As indicative of the scope of the invention, various embodiments thereof have been shown in the accompanying drawings, and these embodiments, as illustrative of the invention, will be specifically described hereinafter.

In the drawing:

Figures 1, 3, 5, 7, 9 and 11 are axial sections of valve stems, or the tip portions thereof, showing illustrative embodiments of the invention, and Figures 2, 4, 6, 8, 10 and 12 are sections on the corresponding lines of Figures 1, 3, 5, 7, 9 and 11, respectively.

In the drawing, the stems are shown in upright position and for the sake of convenience of description, will be considered to occupy this position herein.

Referring to the drawing, and first to Figures 1 and 2, reference numeral 62 designates a valve stem of yieldable material, such as rubber or rubber composition, here shown as being integral with a flap or patch 55 vulcanized to the exterior surface of a tube 56. The stem is provided with a through passage 57 registering with an aperture 58 in the tube. As shown, the stem is tapered from its base to its tip and presents an exterior surface uninterrupted longitudinally by any protuberances. Preferably, the stem is externally unconfined by any reinforcing bands or the like and, desirably, the stem may be made of a rubber composition including freely intermixed fibers which serve to reinforce the stem against appreciable distention.

The tip end of the rubber stem 62 has fixed therein a nipple 63 having a constriction 64 adjacent its lower end, the nipple lining the tip portion of the stem and constituting a continuation of the passage 57.

The lower end of the nipple is embedded in the stem material, so that its lower inner margin is covered by means of an annular flap or collar 65 and the nipple presents a seat for a rubber check valve 66 immediately above this collar. The check valve 66 is fixed on the lower end of a pin 67, which at its other end is provided with a head 68. As is shown in Figure 1, the end of the pin embedded in the check valve 66 is somewhat flattened, so that secure anchorage is provided, and the material of the check valve covers the lower end of the pin so as to prevent pressure from entering between the pin and the check valve. Pin 67 has a spider 69 fixed thereon below head 68 for guidance in the upper portion of the nipple passage, the spider, which is itself a head portion, in large part filling the tip end of the passage, as clearly shown in Figure 2. Also, the pin is slidable in a spider 70 which seats downwardly on a shoulder at the top of the constriction 64, a compression spring 71 being interposed between the two spiders. Assembly is made by forcing the check valve 66 downwardly through the constriction in the manner above described, spring 71 reacting against spider 70 to hold the check valve 66 normally at the lower end of the constriction.

According to Figures 3 and 4, the upper end of stem 72 is provided internally with an integral conically shaped collar 73 which constricts the stem passage and provides a downwardly faced shoulder for the check valve 74, which is of relatively rigid material, such as metal. The lower end of the nipple or tubular insert 75 engages around collar 73, so that the latter serves to provide not only a seat for the check valve, but also to prevent access of pressure between the nipple and stem, the insert being secured in the rubber stem body by vulcanization. The check valve has a pin 76 fixed thereto at one end, the other end of the pin being provided with a head 77, which, in the seated position of the check valve, projects somewhat above the top of the nipple. A spider 78 is fixed to the pin 76 immediately below the head 77, and between this spider and the shoulder 79 formed in the nipple is interposed a compression spring 80, which serves to seat the check valve.

According to Figures 5 and 6, the stem 81, or at least its tip portion 82, is considered to be made of rubber sufficiently hard to take threads 83 engageable by a filling connection or cap. The through passage of the stem has a constricted portion 84, beneath which is adapted to seat a check valve 85, the downward movement of the check valve being limited through its abutment with the top of ribs 86 projecting inwardly from the passage walls. A pin 87 is fixed to the check valve 85 and is provided with a head 88. A spider 89 is fixed to the pin 87 beneath the head, and the pin is slidable in a spider 90 which seats downwardly on a shoulder provided at the top of the constricted portion 84. A compression spring 91 interposed between the two spiders serves to hold the valve 85 in normally seated position. Here, as in Figure 3, the valve is inserted to its operative position through the constricted portion of the passage, which is temporarily enlarged. The relatively hard tip portion serves to restrain expansion of the seat by the valve body 85 under the force of the spring, and also reduces friction in the sliding movements of the head portion.

According to Figures 7 and 8, the stem 92 is provided with a through passage having a constriction 93 presenting at its top a substantially square shoulder and at its bottom a flared or bevelled shoulder against which is adapted to seat a check valve 94 of relatively rigid material. A pin 95 secured to the check valve is provided at its top end with a head 96 and beneath the head with a spider 97 guided in a ferrule or tubular insert 98 which lines the top portion of the stem passage and reinforces the tip of the stem against compression. A conical compression spring 99 surrounds the pin 95 beneath spider 97, and upon insertion of the valve through the passage restriction, rests with its large end upon the square shoulder at the top of the restriction, reacting thereon to seat the valve.

The valve stem 100 of Figures 9 and 10 has a through passage with a constriction 101, beneath which, upon forcible insertion therethrough, is seated a check valve 102. A pin 103 fixed to the check valve has thereon a spider 104 guided in the stem passage above the constriction. At its top extremity the pin is provided with a head 105. A plug 106, here shown as being substantially cruciform in cross section, is inserted in the stem passage through the lower end thereof to a position in which an upward reduced projection 107 of the plug rests against the bottom of the check valve to hold the latter seated. Preferably, the upper end of the projection 107 is slightly dished or concaved, so that relative sliding between it and the valve is prevented. The plug and its projection are of yieldable material, such, for example, as the material of the stem itself, so that in the filling operation the valve is permitted to unseat sufficiently, being immediately returned to seating position upon the breaking of the supply connection. This form of the invention does away with the use of the metal spring. The plug 106 is held in position frictionally or by cement or vulcanization.

The arrangement shown in Figures 11 and 12 is exactly the same as that shown in Figures 9 and 10, with the exception that plug 108 forms an integral part of the stem 109, this construction being entirely feasible and presenting obvious advantages.

The spiders as for example at 78 and 97, Figures 3 and 7 respectively, not only serve as spring abutments and as guides cooperating with the inner walls of the inserts to maintain the valve pins coaxial with the inserts, but since they in large part fill the insert openings, they serve as guards or heads for the exclusion of particles of foreign matter from the interior of the stem passage. This latter feature is particularly present when the spiders, in the seated position of the valve bodies, are in the outer or upper extremities of the inserts.

In Figure 3 the insert has its lower end in substantially surrounding relation to the valve shoulder or seat so that undue distention or distortion of the latter in use is effectively prevented. The insert serves to reinforce the tip end of the stem body generally, provides a smooth guiding surface for the spiders and provides a spring seating ledge so that the entire arrangement is very compact and efficient. In Figure 7 the insert, it will be noted, is entirely rubber covered circumferentially. The insert, so disposed, is useful in sustaining the tip of the stem body against collapse when an air chuck is applied thereto.

Where no stiffening is provided for the tip end of the stem, means are preferably provided to limit the unseating movement of the check valve, so that the head of the latter will serve to open the valve of the filling chuck, since otherwise partial collapse of the tip end may obstruct this action. A globular check valve is preferred, although this shape is not essential. The shape of the check valve should be such that it may seat properly against the cooperating shoulder, and where it is to be forcibly inserted through a constriction, it should be so shaped as to facilitate such insertion. It may be stated that by grasping the head of the valve pin and slightly lubricating the valve, as with soapy water, the latter may be very easily forced through the stem constriction, and there is no danger whatever of its being expelled from the stem under any ordinary air pressure.

From the above it will be seen that the invention contemplates a valve stem providing direct cooperation with a check valve and its appurtenances so that a relatively cheap construction is afforded but without any loss in efficiency. It will be understood that the disclosure herein is not intended to be restrictive as to details of structure, form, or arrangement of parts. The invention includes all constructions coming withing the scope of the following claims.

I claim:

1. A valve stem comprising an elongated rubber body having a through passage from base to tip provided with constricting means near its tip end, said constricting means providing an annular shoulder faced toward the base of the stem; a unit comprising valve means having a pin fixed thereto, an abutment fixed to said pin remote from said valve means, a second abutment on the pin between the first abutment and the valve means and relative to which the pin is slidable, and a compression spring surrounding the pin between said abutments; said unit being insertable in the tip end of the passage and the valve means forced through the constricting means to position said valve means operatively relative to said shoulder and said abutments within the passage portion outwardly of said constricting means with said second abutment fixedly engaged in said passage portion and the first abutment freely slidable therein, said constricting means forming a stop within said passage portion limiting the insertion of said second abutment therein, one of said means being of yieldable material to permit such insertion of the valve means, said spring acting on said abutments to hold said valve means yieldingly against said shoulder.

2. A valve stem comprising a flexible rubber body having a through passage constricted at its tip portion to provide a yielding integral annular valve seat of the stem material faced toward the base of the body, and a movable valve member cooperative with said seat to close said passage, said body including an integral annulus of relatively hard rubber, as compared to the rubber of the main portion of the body, in surmounting relation to said seat whereby to restrain expansion of the latter.

3. A valve stem comprising an elongated rubber body having a longitudinally extending through passage, a tubular insert in the outer portion of said body and in part lining said passage, said insert having a threaded portion projecting beyond the outer end of said body and having an internal constriction intermediate its ends, there being a valve seat within the insert below said constriction and a spring abutment within the insert above said constriction, a movable valve body cooperable with said valve seat and disposed within the inner end of the insert when seated, a pin on said valve body extending outwardly past said constriction, a head portion on the outer end of said pin and guided by said insert so that said pin is substantially coaxial with the latter when said valve body is seated, said head portion at least in large part filling the outer end portion of the insert when said valve body is seated, and a compression spring surrounding said pin between said head portion and said abutment and normally holding said valve body seated.

4. A valve stem comprising an elongated rubber body having a longitudinally extending through passage, said passage having a constriction intermediate its ends providing an inwardly faced annular seat and an outwardly faced ledge, the tip portion of said body being of relatively hard rubber as compared to the rubber of the main portion of the body, said seat and tip portion constituting integral parts of said rubber body, a movable valve body cooperable with said seat, a pin on said valve body extending through said constriction and beyond said ledge, a head portion on said pin and guided in said tip portion, and a compression spring between said head portion and said ledge and normally holding said valve body seated, said seat being adjacent said tip so that the latter serves to restrain expansion of the seat by the valve body under the action of said spring.

FRANK H. WATSON.